Nov. 28, 1950     H. E. WHITMIRE ET AL     2,532,251
SPRAYING APPARATUS FOR TREATING LIVESTOCK
Filed Sept. 3, 1949

INVENTORS:
HOMER E. WHITMIRE
RALPH J. KNEPPER

BY *Branning and Sutherland*

ATTORNEYS.

Patented Nov. 28, 1950

2,532,251

UNITED STATES PATENT OFFICE 2,532,251

SPRAYING APPARATUS FOR TREATING LIVESTOCK

Homer E. Whitmire, Clayton, and Ralph J. Knepper, Kirkwood, Mo., assignors to Whitmire Research Laboratories, Inc., St. Louis, Mo., a corporation of Missouri Application September 3, 1949, Serial No. 113,984

7 Claims. (Cl. 119—159)

This invention relates generally to animal husbandry, and particularly to an apparatus for treating livestock to control infestation by parasitic larvae.

The infestation of livestock by so-called "grubs," which are the larvae of the heel fly, is a condition which not only retards the growth and development of the animal, but may render the hide, or substantial portions of it, unfit for leather. The grub establishes itself beneath the hide, bores a vent hole through the hide, and grows to maturity and finally emerges through the hole in the hide of the animal. The losses suffered by livestock producers because of grub infestation of their cattle amount to stupendous sums each year.

Heretofore it has been proposed to treat cattle for grub infestation by spraying them with high velocity, high pressure, needle-like streams of insecticide. The impingement of such needle-like streams upon the backs of the cattle is painful and shocking to them, disturbing to their temperaments, and only partially effective, for the reason that the hair protects the larva's vent hole from direct exposure to the needle-like streams and, unless the insecticide is delivered at the larva's vent hole, the larva is not contacted with it.

The object of the present invention, generally stated, is to provide an apparatus for delivering an insecticide beneath the hair of cattle, and at the vent hole of the larva.

Another object of the invention is to provide a device of the character referred to which is easy to manipulate, and which follows the contour of the animal's body as it is manipulated, irrespective of the direction in which the device is moved.

Other objects will become apparent to those skilled in the art when the following description is read in connection with the accompanying drawings, which illustrate one embodiment of the invention, and wherein.

Figure 1:
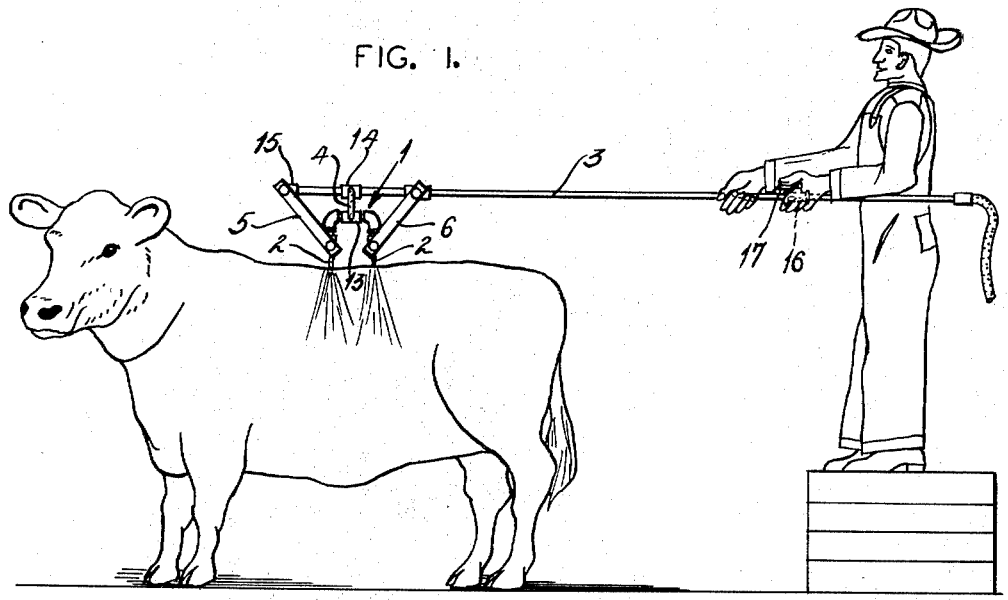
Figure 1 is a view in side elevation of a brute undergoing treatment with the apparatus of the present invention.

Generally stated, the present invention contemplates a rake-like device whose tines are provided with bores through which insecticide may be delivered as the hair of the animal is roughed up by movement of the rake-like device back and forth across the body of the brute. The invention contemplates that a plurality of such rake-like, hollow tined devices be arranged in tandem to receive the insecticide from a common source of supply, and manipulated so that, irrespective of whether the device is being pushed forward or pulled backward, and irrespective of whether the animal is tall or short, or whether the man manipulating it is tall or short, the several series of tines will follow the contour of the animal's body.

The invention particularly contemplates that the handle by which the rake-like device above mentioned is manipulated be a rigid pipe, serving not only as a manipulating handle but as a conduit for delivering the insecticide from a source of supply to the aforesaid tines; and that such conduit-handle be flexibly connected with the members from which the tines depend.

Referring now to the drawings for an illustrative embodiment of the invention, the device consists essentially of a head 1 having a hollow interior. A plurality of tines 2 extend downwardly from the head 1. Each of the tines has a bore 20, and is connected with the head 1 so that fluid may pass from the interior of head 1 through the bores 20. The tines are sufficiently rigid to avoid bending in use, being preferably made of metal tubing.

Associated with the head 1 is a length of pipe 3, which functions not only as a handle by which the head 1 may be manipulated, but also as a conduit through which the insecticide may be transmitted from a source not shown to the head 1. Accordingly, the pipe 3 is connected to the head 1 by a flexible fluid connection 4, which may take the form of a flexible pipe, or a short length of hose.

In order to assure that the tines 2 remain in contact with the skin of the animal being treated, and extend in a direction substantially perpendicular to the portion undergoing treatment at any increment of time, a floating mechanical connection is provided between the pipe 3 and the head 1 such that the flexible fluid connection 4 is substantially relieved of all mechanical forces incident to the manipulation of the device. In the embodiment shown, said mechanical connection consists of swing hangers or links 5 and 6, pivotally connected at their upper ends to the pipe 3 in lengthwise spaced relation, while their lower ends are pivotally connected to the head 1 in spaced relation (lengthwise of pipe 3) but closer than the connection to pipe 3, so that the swing hangers 5 and 6 diverge upwardly.

Figure 2:
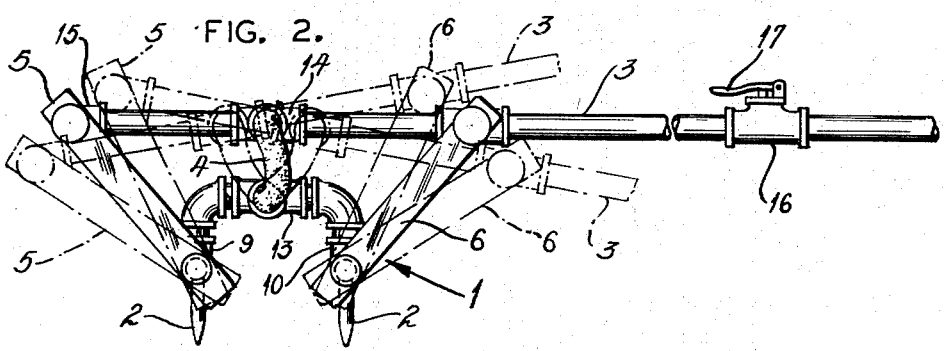
Figure 2 is an enlarged view in side elevation showing, in dotted and broken lines, relative positions of the device.
Figure 3:
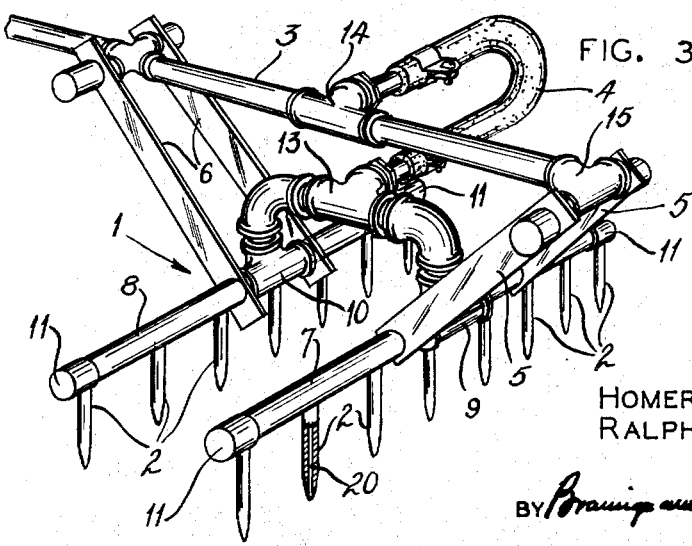
Figure 3 is a perspective view of the apparatus shown in Figure 2.

In the embodiment shown in detail in Figures 2 and 3, the head 1 is made up of pipe and pipe fittings, and consists of a pair of header pipes 7 and 8, each having a central T 9 and 10. The extremities of the header pipes 7 and 8 are closed, as by caps 11. Each of the pipes 7 and 8 is drilled and threaded to accommodate the plurality of tines 2, so that the central bores 20 therein communicate with the interior of the respective header pipes. Interconnecting the T's 9 and 10 is a series of nipples and L's leading to a central T 13. From the latter T, the flexible connection 4, shown as a short length of rubber hose, extends to and connects with pipe 3 through T 14. Beyond T 14, pipe 3 is provided with a T 15, which is closed against the egress of fluid from the interior of the pipe, but arranged to pivotally mount a pair of links constituting swing hanger 5. At the opposite side of T 14, pipe 3 is arranged to pivotally mount a comparable pair of links constituting the swing hanger 6. The lower ends of the swing hangers 5 and 6 are provided with holes of a size to accommodate the respective header pipes 7 and 8, and thus pivotally mount the parts relative to each other.

Outwardly beyond the pivotal connection between the swing hanger 6 and the pipe 3, the latter is provided with a valve 16, preferably of the spring type, having a thumb lever 17. The valve 16 is so located that during manipulation of the device, one hand of the operator may grasp the valve to open or close it, as the circumstances require.

As clearly shown by the dotted lines in Figure 2, the arrangement above described permits a substantial variation in the angularity of conduit handle 3 relative to the plane of the tips of tines 2. The arrangement is nonetheless such that, irrespective of whether the device is being moved toward the left or toward the right, the trailing gang of tines is prevented from tilting up out of engagement with the skin of the animal. It is readily apparent that, where the handle is flexibly mounted with reference to the tines, the resistance offered by the hair against movement of the lower extremities of the forwardmost tines will tend to tilt the device about the tips of the forward gang of tines, thus lifting rearward gangs of tines out of contact, unless some means is provided for so preventing. The arrangement of swing hangers shown in the drawings prevent such tilting, irrespective of the direction in which the device is being moved, and irrespective of the angle (within practical limits) which the conduit handle 3 may assume relative to the plane of the tines. Thus, whether the animal being treated is large or small, or whether the man who operates the device holds the handle high or low, makes no difference in the angle with which the several gangs of tines 2 engage the animal.

By moving the device back and forth across the back and sides of a grub infested animal and concurrently delivering insecticide through pipe 3, head 1, and tines 2, the hair of the animal is roughed and the insecticide delivered at the skin where the vent has been cut by the larva. The tines 2, which are associated with header pipe 7, are preferably in staggered relation relative to the tines 2 which are associated with header pipe 8. In the embodiment shown there are eight tines associated with header pipe 7, while there are only seven tines associated with header pipe 8, so that the tines of the latter gang follow in the spaces between the tines of the former gang. It is desirable that the tips of the several tines be rounded rather than sharp, in order to prevent the possibility of lacerating the animal during treatment, and to minimize the possibility that the tine may hang in a vent opening cut by a grub. With the use of the device of the present invention, it is not necessary to apply insecticide under pressures higher than that necessary to move it from the source through the device. Consequently the treatment is one which is pleasant and refreshing to the animal, rather than painful and shocking.

From the foregoing description, those skilled in the art should readily understand the construction and operation of the device, and realise that it accomplishes its objects. While a complete disclosure has been given of one embodiment, it is to be definitely understood that the invention is not limited to the details of that embodiment. Other variations will immediately present themselves to those skilled in the art without departing from the principle of the invention. Consequently it is to be understood that such modifications and variations as do not depart from the scope of the appended claims are contemplated.

Having thus described the invention, what is claimed and desired to be secured by Letters Patent is:

1. A device of the kind described comprising a header, a gang of tines projecting downwardly from the header, said tines having a bore extending from the tips thereof and communicating with the interior of said header, an elongated rigid conduit, and a flexible connection between said conduit and said header arranged to pass fluid from the interior of the conduit to the interior of the header.

2. The device of claim 1 having a link pivoted at one end to the header and at the other end to the conduit.

3. A device of the kind described comprising a pair of headers connected in spaced parallel relation, tines depending from said headers, an elongated handle extending in a direction substantially at right angles to said headers, and swing hangers connecting said handle to said headers respectively.

4. The device of claim 3 wherein the swing hangers converge toward the tines.

5. The device of claim 3 wherein the tines have bores extending from the free ends thereof to the interior of the headers, and a flexible conduit connected with said headers.

6. A device of the kind described comprising a head having a multiplicity of hollow tines depending therefrom, an elongated rigid conduit arranged to extend laterally away from said head, a pair of swing links pivoted to said conduit at positions spaced lengthwise thereof and pivoted to said head at positions more closely spaced, and a flexible conduit connected with said header.

7. A device of the kind described comprising a hollow header, a series of hollow rigid tines depending from said header, said tines having pointed tips, an elongated pipe connected at one end to said header, and a valve near the opposite end of said pipe.

HOMER E. WHITMIRE.
RALPH J. KNEPPER.

REFERENCES CITED

The following references are of record in the file of this patent:

UNITED STATES PATENTS

| Number | Name | Date |
| --- | --- | --- |
| 634,617 | Hansen | Oct. 10, 1899 |
| 983,820 | Goff | Feb. 7, 1911 |
| 1,147,546 | Rees | July 20, 1915 |
| 1,534,241 | Nichols | Apr. 21, 1925 |
| 1,728,113 | Fertally | Sept. 10, 1929 |